Oct. 3, 1961   C. P. WARMAN, JR., ET AL   3,002,597
DUAL AIR TUBE CLUTCH FOR REVERSIBLE DRIVES
Filed Nov. 4, 1957   9 Sheets-Sheet 4

INVENTORS.
CHARLES P. WARMAN, JR.
JACK W. MOSS
BY
Wayland D. Keith
THEIR AGENT.

Oct. 3, 1961　　　C. P. WARMAN, JR., ET AL　　　3,002,597
DUAL AIR TUBE CLUTCH FOR REVERSIBLE DRIVES
Filed Nov. 4, 1957　　　　　　　　　　　　　9 Sheets-Sheet 8

Fig. 10

INVENTORS.
CHARLES P. WARMAN JR.
JACK W. MOSS
BY
Wayland D. Keith
THEIR AGENT

United States Patent Office 3,002,597
Patented Oct. 3, 1961

3,002,597
DUAL AIR TUBE CLUTCH FOR REVERSIBLE DRIVES
Charles P. Warman, Jr., and Jack W. Moss, both of P.O. Box 1150, Wichita Falls, Tex.
Filed Nov. 4, 1957, Ser. No. 694,294
1 Claim. (Cl. 192—87)

This invention relates to improvements in clutch driving mechanisms, and more particularly to multi-clutch drive mechanisms for selectively reversing gears, as in marine applications, driving screw propellers, and the like.

Various reverse gear clutching mechanisms have been proposed heretofore, both with mechanically actuated clutches and with fluid actuated clutches; but these mechanisms have had certain features, which, in time, would present difficulties, and it is to the end of overcoming these deficiencies, that the present device has been designed.

In the present device, the reversing of marine gears through of the use of dual clutches, from full speed in one direction to full speed in the opposite direction, can be accomplished practically instantaneously, with the clutches minimizing the shock on the driver and driven mechanism.

The present invention provides a device whereby one of the clutches may be selectively connected in driven relation so that the propeller, or the like, can be driven in one direction and instantly changed so the other clutch can be connected in driving relation, to drive the propeller in the opposite direction. The present invention is so constructed that it can be kept cool under heavy operating conditions.

The present invention utilizes a plurality of axially expansible tubes to cause the selective axial engagement of friction disc clutch elements with clutch plates, by the action of fluid pressure within the respective tube elements which in turn cause friction disc clutch elements and clutch plates to be moved into relative binding engagement, so that the engaged clutch disc will be driven in the direction of rotation of the engine. However, since the other of the friction disc clutch elements is integrally connected, as a unit, and is connected to the first mentioned clutch member by a reversing gear, the clutch disc within the other clutch will be driven in the opposite direction.

An object of this invention is to provide a multi-clutch coupling unit for connecting the driver element of a prime mover, with the driven element in such manner that the driven element may be selectively driven in either direction by the manipulation of fluid control valves leading to the multi-clutch coupling unit.

Another object of the invention is to provide a multi clutch coupling unit for connecting a prime mover to a driven element, which coupling unit is in axial alignment with the drive shaft of the prime mover.

Still another object of the invention is to provide a clutch coupling unit which has at least two fluid actuated, axially expansible, substantially annular, closed tube elements which may be selectively operated from a remote station.

Yet another object of the invention is to provide a multi-clutch, multi-coupling unit which is so constructed as to enable the ready repair, removal and replacement of the clutch parts, such as the tube elements and friction disc elements without removing the clutch unit from the shaft of the driven element.

A still further object of the invention is to provide a multi-clutch unit wherein the axially expansible tubes are positioned axially exterior of the clutch plates, so as to enable heat generated by the friction elements to be readily dissipated.

Yet a further object of the invention is to provide a low inertia clutch, whereby only a single disc need be reversed when the clutch is disengaged and engaged in the opposite direction.

Still another object of the invention is to provide for the free flow of cooling air through the clutch disc at all times.

Another object of the invention is to provide a tube which is so designed as to exert axial pressure only, with no torque present on the tube upon application of the clutch.

With these objects in mind and others which will become manifest as the description proceeds, reference is to be had to the accompanying drawings, in which like reference characters designate like parts in the several views thereof, in which.

With more detailed reference to the drawing, the numeral 1 designates generally a reverse gear unit, such as used in marine drives and the like. The numeral 2 designates generally a multiple clutch unit used in driving the marine reverse gears, and which unit 2 is composed of two separate clutching elements which are actuated by axially expansible, substantially annular, closed tube elements.

Figure 1:
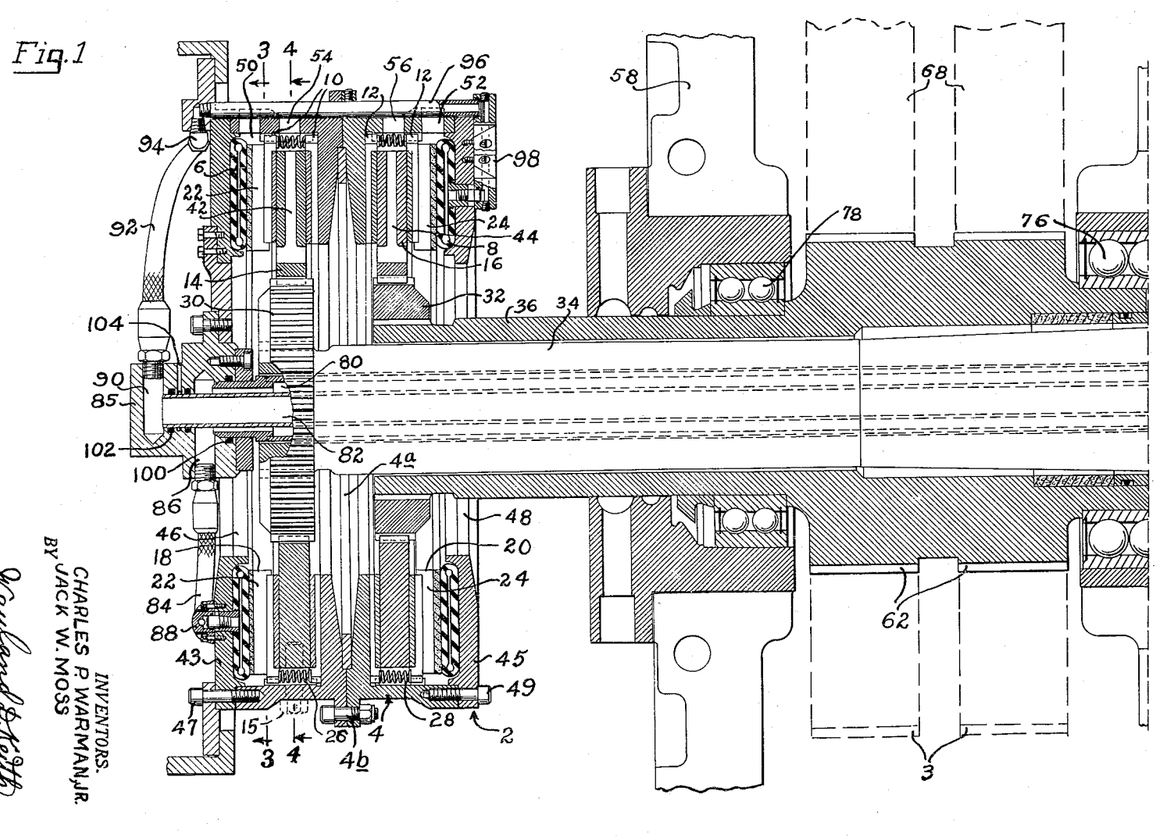
FIG. 1 is a longitudinal sectional view through a multi-clutch reversing unit, showing the manner in which the clutches thereof are connected to the reversing mechanism shafts, and showing a portion of the reversing gear mechanism case and gears associated with the shafts.
Figure 2:
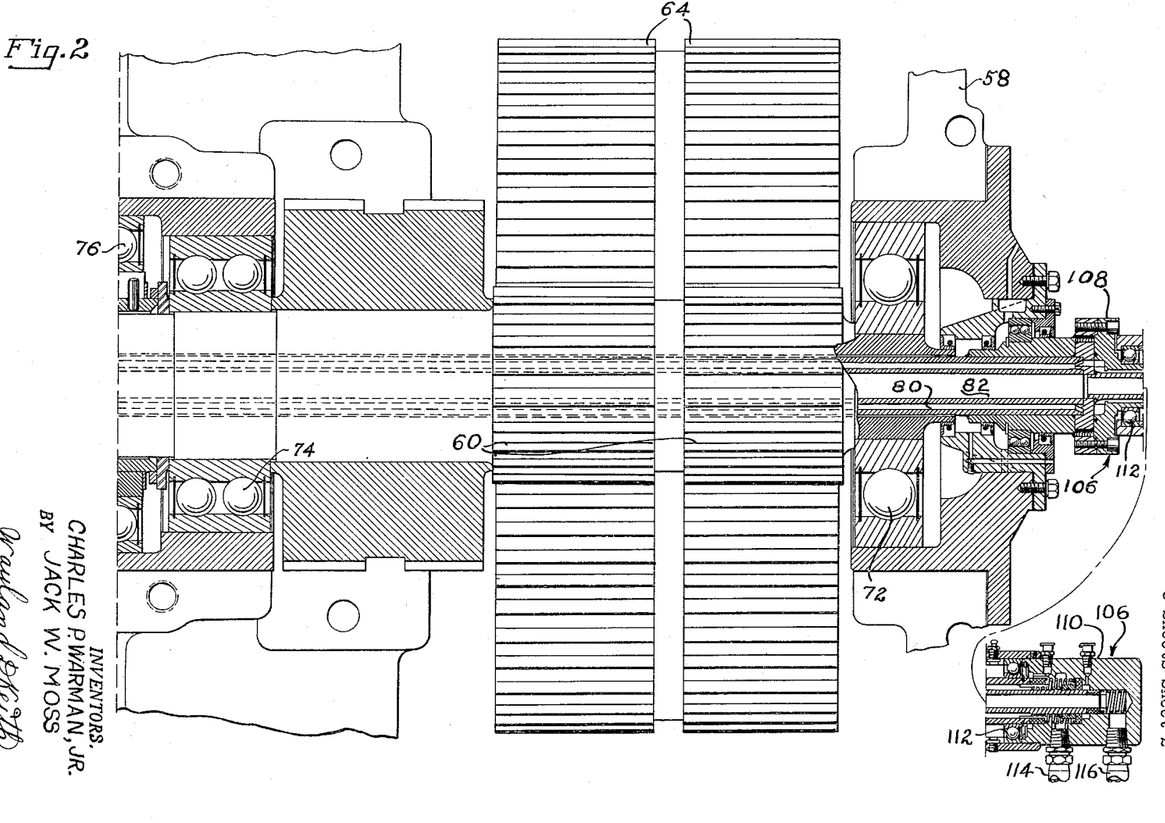
FIG. 2 is a longitudinal continuation of the device shown in FIG. 1, showing the remaining portion of the gear case and the gears on the shafts and showing the fluid conduits through the shaft, and the rotary fluid coupling connected to the shaft.
Figure 3:
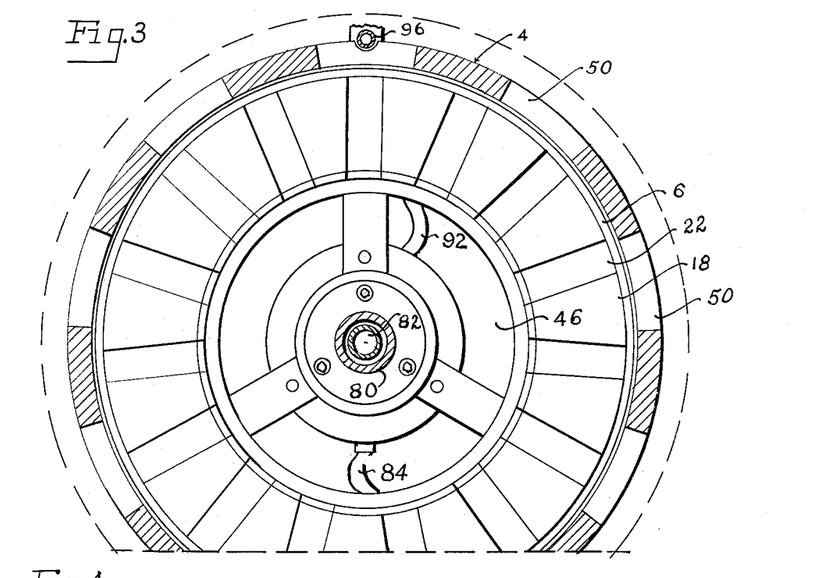
FIG. 3 is a sectional view taken on the line 3—3 of FIG. 1, looking in the direction indicated by the arrows.
Figure 6:
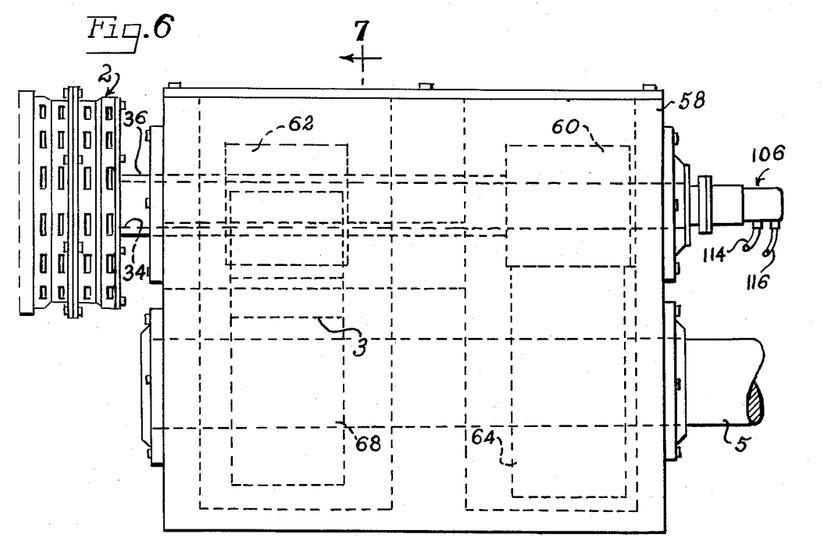
FIG. 6 is an elevational view, on a reduced scale, of the clutch and reversing gear unit.

The reverse gear mechanism, as shown in FIG. 6 and in FIGS. 1 and 2, is of the spur gear reversing type which utilizes a drive gear 62 on the clutch shaft 36, and an idler back gear 3, which is in mesh with the gear 62 on the clutch shaft and with gear 68 on the propeller shaft 5, which back gear 3 drives the propeller shaft 5 in "reverse" or astern direction.

Figure 4:
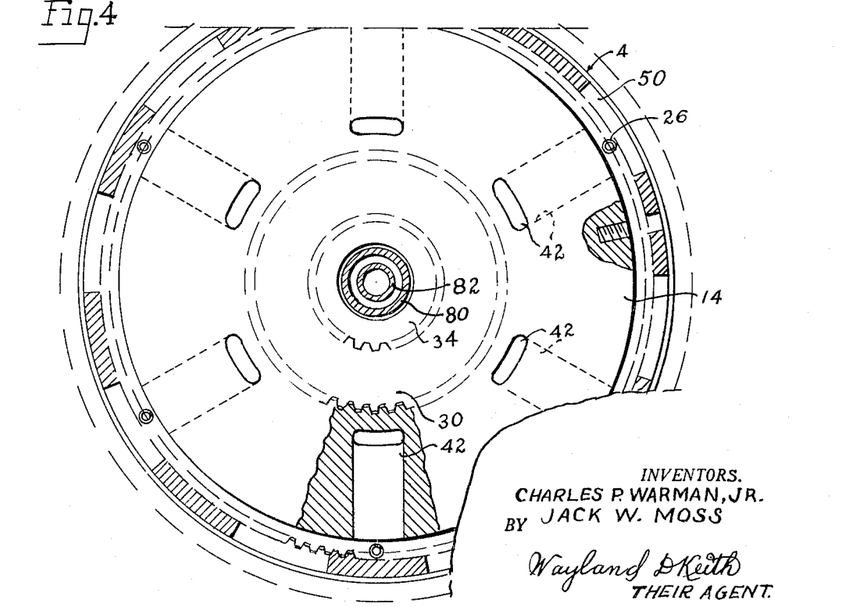
FIG. 4 is a sectional view taken on the line 4—4 of FIG. 1, looking in the direction indicated by the arrows.
Figure 7:
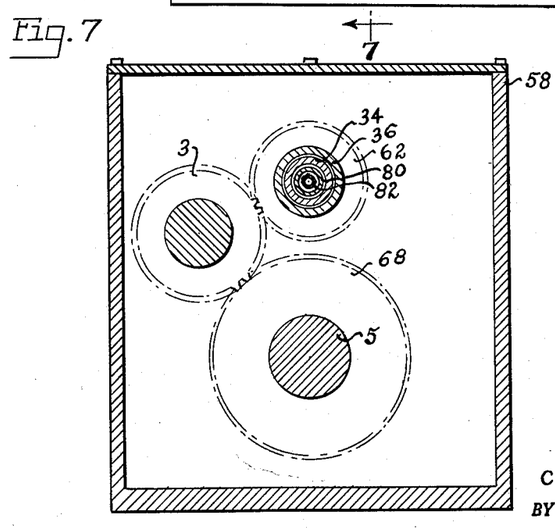
FIG. 7 is a sectional view taken on the line 7—7 of FIG. 6, looking in the direction indicated by the arrows.

The clutch unit 2 is bolted to a fly wheel, or other rotating member of a prime mover, so when the shaft of the prime mover rotates, the housing or casing 4, including the axially expansible tube members 6 and 8, together with the friction disc elements 10 and 12 will rotate freely, until such time as it is desired to engage one or the other of the clutch elements with the clutch disc 14 or the clutch disc 16, whereupon, by directing air to one of the axially expansible tubes 6 or 8, the expanded tube will cause the back plate 18 or 20 to move into engagement with the adjacent friction disc 10 or 12. The back plate 18 or 20 is preferably made of a heat insulating material such as asbestos composition or the like, and which has grooves 22 and 24, respectively, therein to provide for the passage of air radially outward therethrough. Then pressure is applied by the respective expansible tubes 6 or 8 to the back plate 18 or 20, the respective back plate will urge the friction disc element 10 or 12 into engagement with opposite sides of the respective clutch discs 14 or 16 to cause the respective clutch disc 14 or 16 to be gripped therebetween, whereupon, with the housing 4, carrying friction disc elements 10 and 12, which are in sliding toothed engagement with annular teeth in said housing, as will best be seen in FIG. 4, the springs 26 and 28, respectively are compressed, so as to enable the gripping of the opposite faces of clutch discs 14 and 16 therebetween. Since the inner periphery of each clutch disc is toothed and in engagement with the respective hubs 30 and 32, which hubs are, in turn, in toothed engagement with the respective shafts 34 and 36, positioned axially of the prime mover, the shafts will be driven in the direction of the rotation of the prime mover shaft. However, since these shafts are connected together in geared relation by a back gearing arrangement, as shown in FIG. 7, the shafts not being driven will be rotated in the opposite direction. However, since the opposite clutch will be disengaged, only one of the plates, 14 or 16 will be rotated, and since these plates are of relatively light construction, and are cored with air passages 42 and 44 at circumferentially spaced intervals, as will best be seen in FIG. 4, the clutch disc will not cause undue drag on the prime mover, nor will the clutch disc prevent the immediate reversing of the shafts from one direction to the opposite direction, as only the clutch plate, hubs, shafts, and gears is the mass being rotated at the time the reversal takes place.

The form of clutch, as shown in FIGS. 1 through 7, has air passages 22, 24, 42, 44, 50, 52, 54 and 56 therethrough, so that air drawn in through opening 46 in the end of the casing or housing 4 will be directed outward through openings 22, 42, 50 and 54 and the air drawn in through opening 48 in the other end of the casing or housing 4 will be directed outward through openings 24, 44, 52 and 56, so as to dissipate heat generated by the respective friction elements engaging the respective clutch disc elements, before the heat reaches the axially expensible, elastomer tubes 6 and 8.

A case 58 encloses the gears 60 on shaft 34 and the gears 62 on shaft 36. The gears 60 and 62 drive gears 64 and 3, respectively, which gears 3 are back gears, and which gears 3, in turn, drive gears 68 in reverse direction from gears 64. The gears 64 and 68 are securely fixed on a shaft 5, on which a propeller may be secured. It will be seen that all the gears run in mesh at all times, and that either clutch may be selectively engaged to cause the friction disc elements 10 to be engaged with clutch disc 14 or the friction disc elements 12 to be engaged with the clutch disc 16, without having to shift gears, as by sliding the gears into and out of mesh, so the shaft 5 can be alternately reversed. In this manner, as quickly as one clutch can be released by the deflation of the axially expansible tube, the other of the tubes can be inflated so as to cause the friction disc elements to engage the other of the clutch discs.

The clutch shaft 34 is journaled within tubular shaft 36, on anti-friction bearings 72 and 74. The shaft 36 is journaled on anti-friction bearings 76 and 78, so as to maintain the repective shafts in aligned, axial relation.

The hub 30 is secured to shaft 34 in tight fitting relation, substantially as if the hub 30 were made integral with the shaft, except, when the hub becomes worn, it may be readily removed by means of a gear puller, to enable the replacement thereof, with a new hub, thereby obviating the necessity of replacing the entire shaft. The same is true of the hub 32, which is secured in tight relation on shaft 36. As pointed out above, the hubs 30 and 32 are provided with teeth thereon, to complementarily engage the teeth on the inner diameter of the respective discs 14 and 16.

The shaft 34 is hollow and has a pair of air conduits 80 and 82 passing therethrough to convey air under pressure to the respective tubes 6 and 8. A hose 84 connects between fitting 86, located centrally of the clutch housing, and a fitting 88 near the periphery of the housing. The fitting 88 conveys the air under pressure into the axially expansible tube 6. A passage 90, within fitting 85, directs air from conduit 82 outward therethrough and into hose 92, and thence into fitting 94 through pipe 96 into a fitting 98 and thence into axially expansible tube 8. The conduits 80 and 82 extend through the shaft 34 and are provided with the respective O-ring seals 100 and 102, so as to prevent leakage of air between the conduits or to atmosphere. A weep hole 104 is provided between O-ring seals 100 and 102, which connects with an annular ring around conduit 82, so in event of air leakage between the conduits, the air will leak to the exterior, without causing the pressure to by-pass into the other of the conduits, which might cause pressure to build up in the axially expansible tubes.

A dual rotary seal 106 is secured to the opposite end of conduits 80 and 82 from the clutch unit 2, which rotary seal is of the conventional type, with the body portion 108 thereof rotating with the conduits 80 and 82, and the portion 110 thereof being journaled on bearings 112, so as to remain non-rotatable, which enables the connecting of hose 114 and 116 thereto for conveying air, under pressure, from a remote source (not shown) to the respective expansible tubes 6 or 8. The air may be selectively directed to either one or the other of the expansible air tubes 6 or 8, so as to cause engagement or disengagement of the clutch member, at will, by means of a conventional air valve (not shown). The rotary seal 106 has conventional sealing elements therein, as is well known in the art of transmitting fluid from stationary to rotating members, and is merely shown as one form of seal which may be used to transmit air under pressure, to the axially expansible tubes 6 and 8.

*Assembly and disassembly*

In marine drives, it is highly desirable to have a drive, the failure of which is very remote, but in event of failure, it is essential to have a drive which may be readily repaired at high sea, or other bodies of water, without the necessity of the clutch unit having to be removed and sent to a shop for repairs.

The present clutch is so designed, that the wearing parts may be readily removed and replaced in a minimum of time, which might mean the difference between a successful voyage or disaster.

The present clutch, which is provided with the expansible tubes 6 and 8 on the outer confines of the clutch housing 4, which clutch tubes are remote from the heat generated between the friction elements 10 and 12 and the respective clutch discs 14 and 16. Furthermore, by the removal of cap screws 47 and 49, which are at circumferentially spaced intervals around the periphery of end plates 43 and 45, and by removing other minor connections, such as the air connection pipe 96, the housing 4 can be moved relative to end plates 43 and 45, which will enable the removal and replacement of tubes 6 and 8, if necessary, as these tubes 6 and 8 each have abutting closed ends, as will best be seen in FIG. 5, which will permit radial removal of the respective tubes from the housing. Furthermore, the friction elements 10 and 12 are provided in semi-annular segments, as will best be seen in FIG. 11, and both forms of the clutch use the same type tube elements, and the same type clutch discs and the same type friction disc elements. After the segmental friction disc elements 10 or 12 have been replaced, or such other repairs as are necessary, have been made, the end plates 43 and 45 may be replaced and secured in place by cap screws 47 and 49, whereupon, the clutch is again ready for operation.

It is preferable to make the housing 4 in separate sections and to bolt these sections together by means of bolts 4b, with a ring 4a interposed between the housing sections, to act as a pilot between the members. In this manner, a sub-assembly may be replaced as a unit, if desired. Each of the clutch discs 14 and 16 is provided with radially tapped holes to receive bolts 15 therein, each bolt 15 passes through a hole in housing 4, which may be in complementary register with clutch discs 14 or 16, so it is possible to operate the marine drive, even though the friction elements are completely gone, or other failure has occurred, such as insufficient air being supplied to the tubes, or the tubes themselves being out of order. With the bolt thus replaced, the desired clutch disc is locked integral with the housing 4, thereby enabling the utilization of a direct drive from the prime mover to the propeller on the propeller shaft. However, if both clutches are inoperative as such, the bolt 15 may be removed from one of the clutch discs and replaced in a complementary hole in the other clutch discs, if it is desired to reverse the drive mechanism.

*Modified form of invention*

The form of the invention, as shown in FIGS. 8 through 11, discloses a modification of the device which utilizes a shaft arrangement substantially as shown in FIGS. 1 and 2, and which device is connected to a source of air pressure substantially in the same manner, and for the sake of clearness and simplicity, the shaft and the connecting hubs are shown removed from the clutch mechanism, so as to show the details of construction of the clutch unit.

Figure 9:
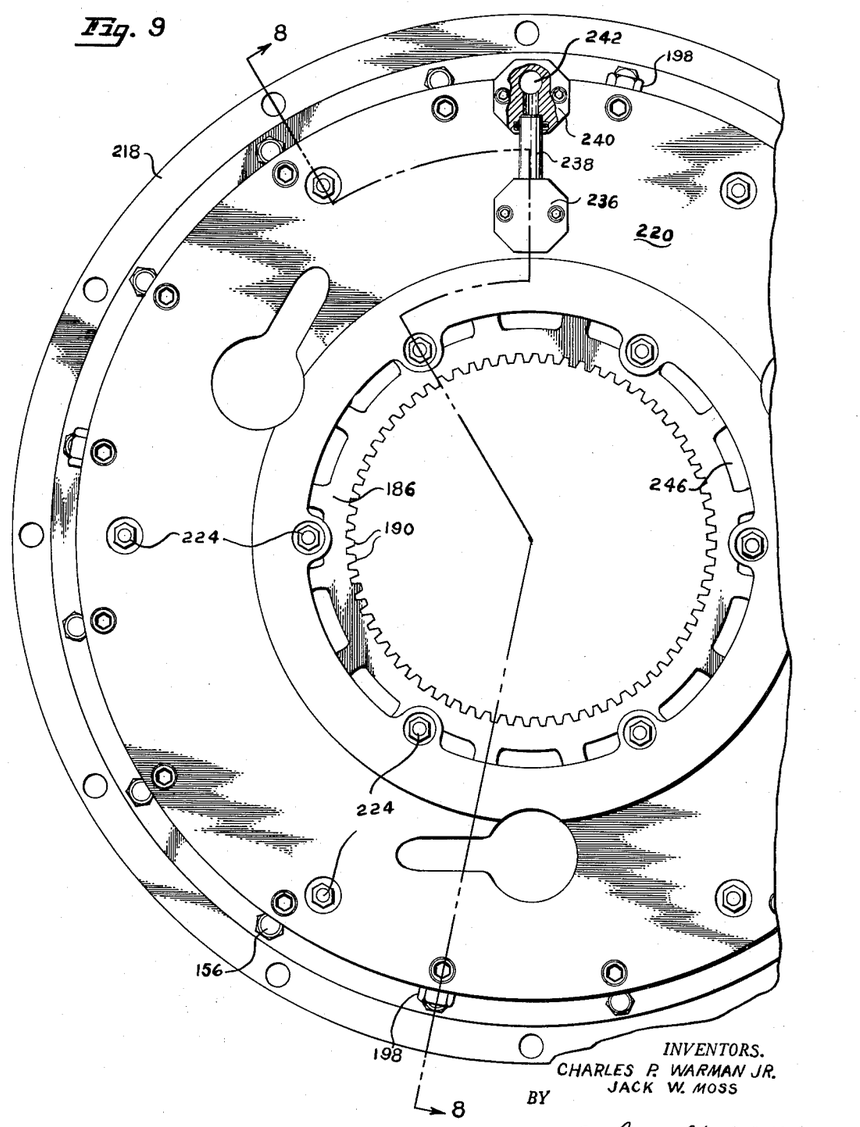
FIG. 9 is an end elevational view of the clutch mechanism, as shown in FIG. 8, with parts broken away and with parts shown in section, to bring out the details of construction.
Figure 10:
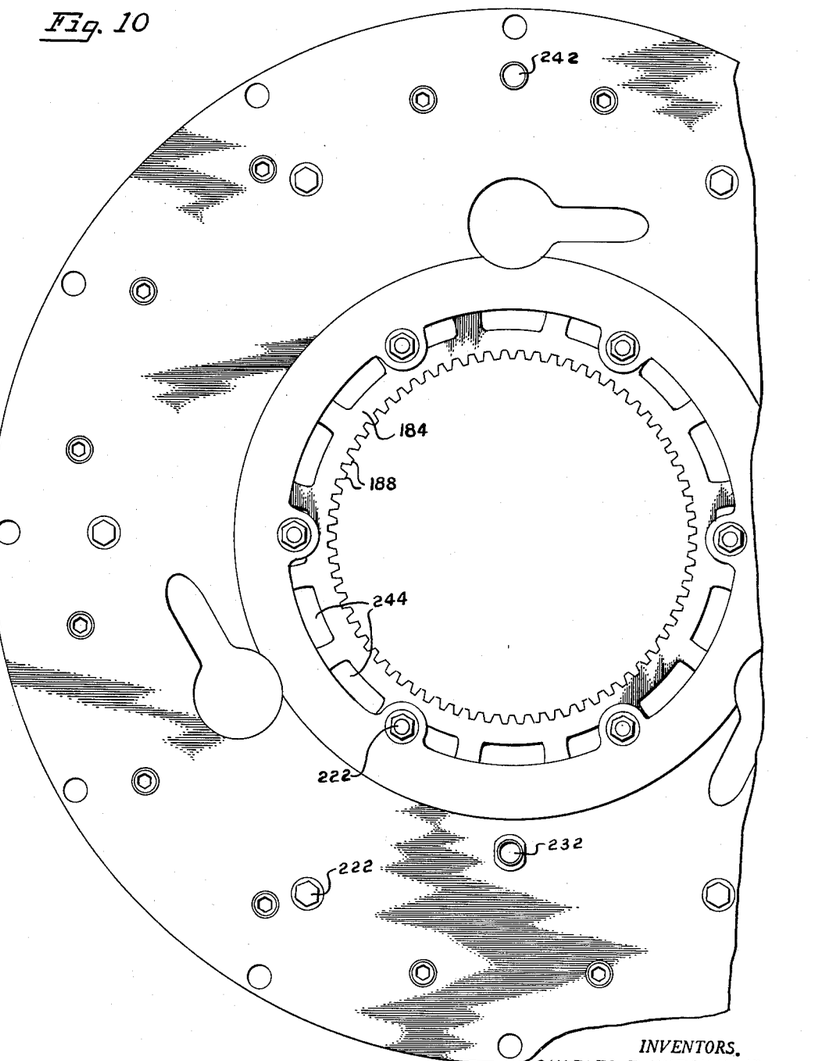
FIG. 10 is an elevational view of the opposite end of the clutch as shown in FIG. 8.

In the present form of invention, the entire clutch unit is designated generally at 151 and comprises two sub-assemblies, which are designated generally at 152 and 154 which are secured together by bolts 156 passing through holes in complementary flanges 158 and 160 of the respective sub-assemblies, which holes are in register and are spaced circumferentially, at spaced points around the periphery of the respective flanges, as will best be seen in FIGS. 9 and 10. The complementary faces of the sub-assemblies have interengaging shoulders 162 to hold the sub-assemblies 152 and 154 in axially aligned relation.

Figure 8:
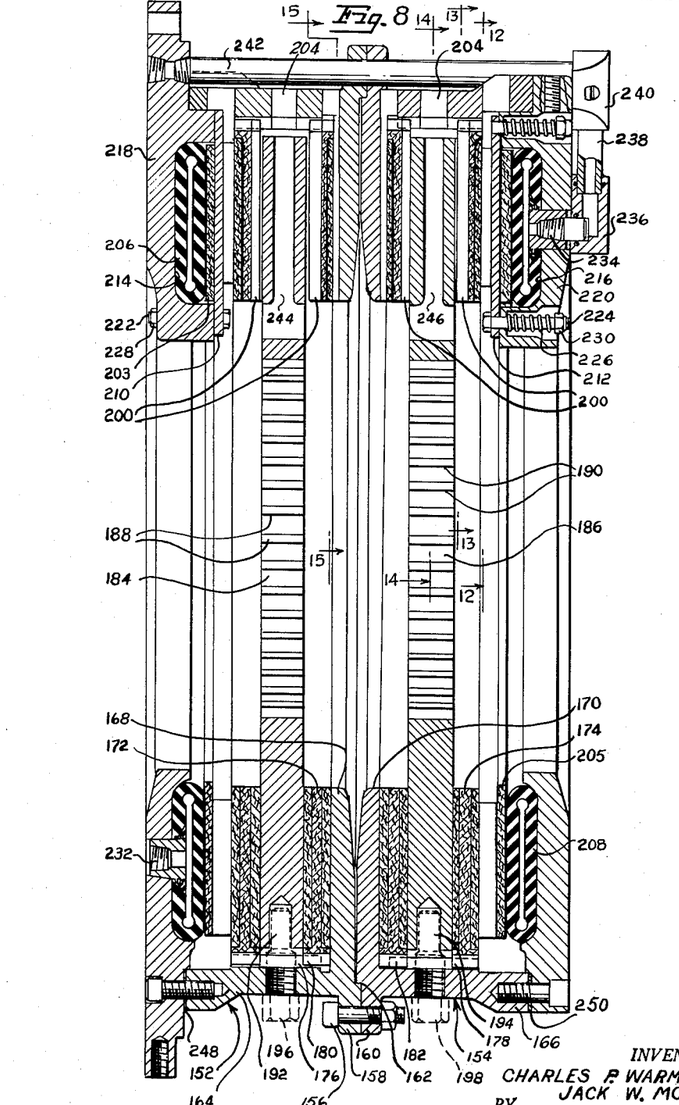
FIG. 8 is a longitudinal sectional view through the clutch portion only, of a modified form of clutch, showing the clutch removed from the reversing gear shafts.

The housings of the respective sub-assemblies 152 and 154 are designated respectively at 164 and 166 and each has an inturned flange 168 and 170, respectively, on the inner side, which forms a back-up plate for the respective friction disc members 172 and 174, as will best be seen in FIG. 8. The inner diameters of the respective housings 164 and 166 have circumferentially spaced, internal teeth 176 and 178 respectively, which teeth interengage with peripheral teeth 180 and 182 in the respective friction disc members 172 and 174. Clutch plates 184 and 186 are fitted within the respective housings 164 and 168 so the inner face of the respective clutch plates will be in abutting relation with an adjacent face of a friction disc member. The clutch plates 184 and 186 each have internal teeth or splines 188 and 190, respectively, to interengage toothed hubs, such as shown respectively at 30 and 32, in FIG. 1. Each of the clutch plates 184 and 186 has a radial hole formed therein, the respective radial holes being designated at 192 and 194 and are formed in the periphery of the respective plates. Each of these holes is in radial register with a screw threaded hole formed in the respective housings 164 and 166, so a screw threaded bolt 196 or 198 may be screw threaded into the respective holes in housings 164 and 166 in such manner that the end of the bolt will project into the hole 192 or 194 in the respective clutch plates 184 or 186, so that either of the clutch plates can be locked integral with the respective housings 164 or 166, however, both bolts 196 or 198 are never engaged in the respective clutch plates at the same time, and one bolt is engaged in one of the clutch plates only as an emergency measure, such as clutch failure or air failure.

After the clutch plates 184 and 186 have been fitted adjacent the respective first mentioned friction disc members 172 and 174, further friction disc members 172 and 174 are positioned on the opposite side of each of the clutch plates 184 and 186, so that the clutch plates will be frictionally engaged between respective pairs of friction disc elements, in a manner that will be more fully brought out hereinafter.

Figure 11:
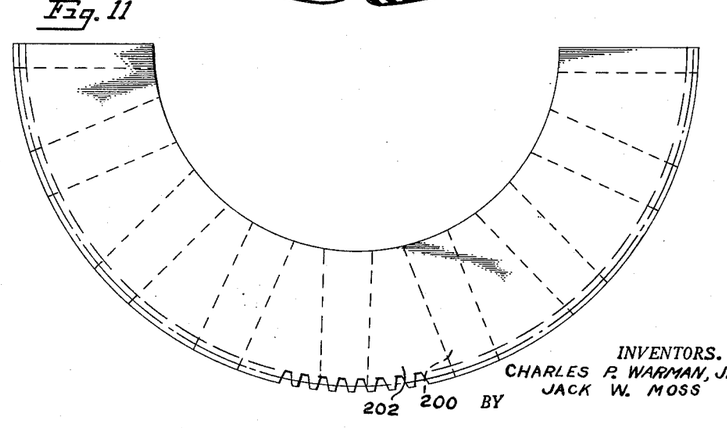
FIG. 11 is a segmental portion of a clutch friction disc element, shown apart from the clutch.
Figure 12:
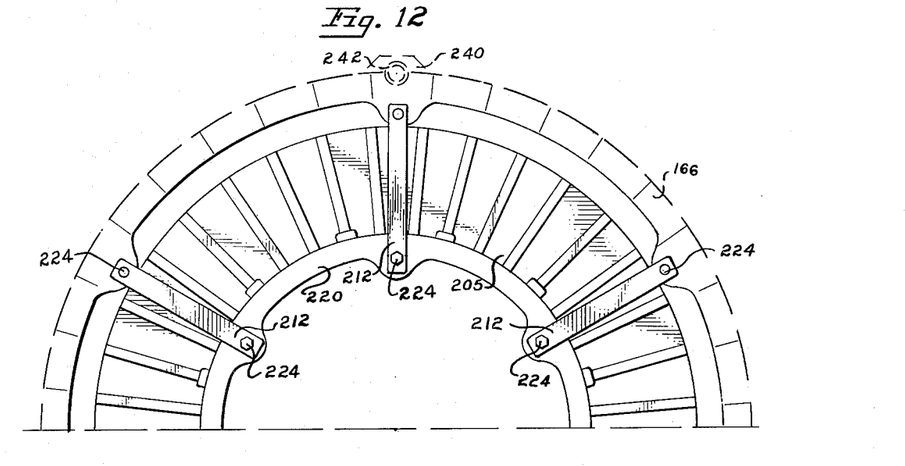
FIG. 12 is a fragmentary sectional view taken on the line 12—12 of FIG. 8, looking in the direction indicated by the arrows.
Figure 13:
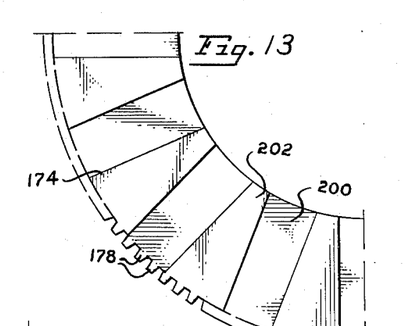
FIG. 13 is a fragmentary sectional view taken on the line 13—13 of FIG. 8, looking in the direction indicated by the arrows.
Figure 14:
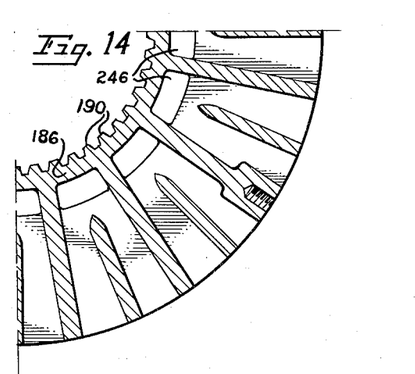
FIG. 14 is a fragmentary sectional view taken on the line 14—14 of FIG. 8, looking in the direction indicated by the arrows.
Figure 15:
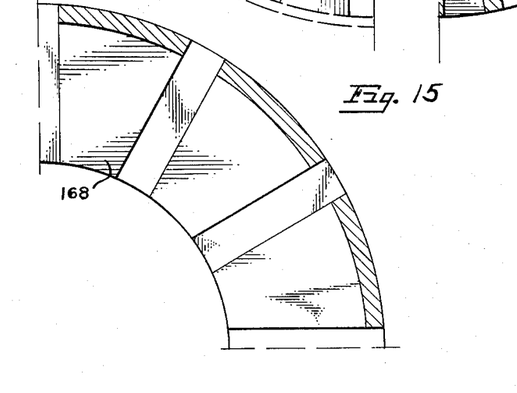
FIG. 15 is a fragmentary sectional view taken on the line 15—15 of FIG. 8, looking in the direction indicated by the arrows.

It is preferable to have the friction disc members 172 and 174 annular in shape when these are initially installed, however, when further friction disc members are installed, while the clutch is in service, and without removing the clutch from the shaft, the friction disc members, as shown in FIG. 11, together with a similar complementary semi-annular segment is used to replace the annular members, as this obviates the necessity of disassembling the clutch mechanism from the driven shaft. Both the annular form, as shown in FIG. 8, and the semi-annular form as shown in FIG. 11, are composed of an asbestos composition material, with the material at the central portion and that forming the teeth being more dense, and with the surfacing of asbestos material having a high coefficient of friction, on each of the outer friction contact faces. Furthermore, these members are of a groove and rib construction, comprising grooves 200 and ribs 202, so air may flow between the friction disc elements and the clutch plates, when engaged, and pass out through radial holes 204 in the outer periphery of the respective housings 164 and 166, so as to dissipate heat created by the engagement of the respective friction disc members with the respective clutch plates.

Back-up or reaction plates 203 and 205, respectively are provided, which are ribbed in a manner similar to the members shown in FIG. 11, and which back-up plates are constructed of asbestos composition material to resist the flow of heat from the respective friction disc members to the respective axially expansible tubes 206 and 208, and to provide additional cooling capacity when the clutches are being slipped constantly to give controlled variable speed output.

The respective bars 210 and 212 abridge the respective recesses 214 and 216 in the respective end plates 218 and 220, into which recesses the respective axially expansible tubes 206 and 208 are fitted in such manner that the bars 210 and 212 are embedded within the grooves of the respective grooved back-up plates 203 and 205, so that the bars are contained within the depth of the grooves within the back-up plates. The bars 210 and 212 are each apertured near the extremities thereof, through which respective apertures the respective bolts 222 and 224 pass, with the bolts also passing through complementary holes at circumferentially spaced points in the respective end members 218 and 220, as will best be seen in FIGS. 8, 9, and 10. A spring 226 is telescoped over each of the bolts, so as to be in bearing relation with the respective end plates 218 and 220. It is preferable to have these springs fitted within recesses in the respective end plates, as will best be seen in FIGS. 8 and 9, so the clutch will occupy a minimum of space. Nuts 228 and 230 are positioned on the respective bolts, so as to draw the springs into binding engagement with the respective end plates 218 and 220, whereupon, the bars 210 and 212 will urge the back-up plate toward the respective axially expansible tubes 206 and 208, to assist in expelling the air from the respective tubes and to retain the tubes in place within the respective end plates 218 and 220.

It is to be pointed out that the springs thus positioned on the respective bolts, are not subject to dislocation and that the nuts on the respective bolts are easily accessible to a socket wrench or the like, for adjusting the tension of the respective springs.

Figure 5:
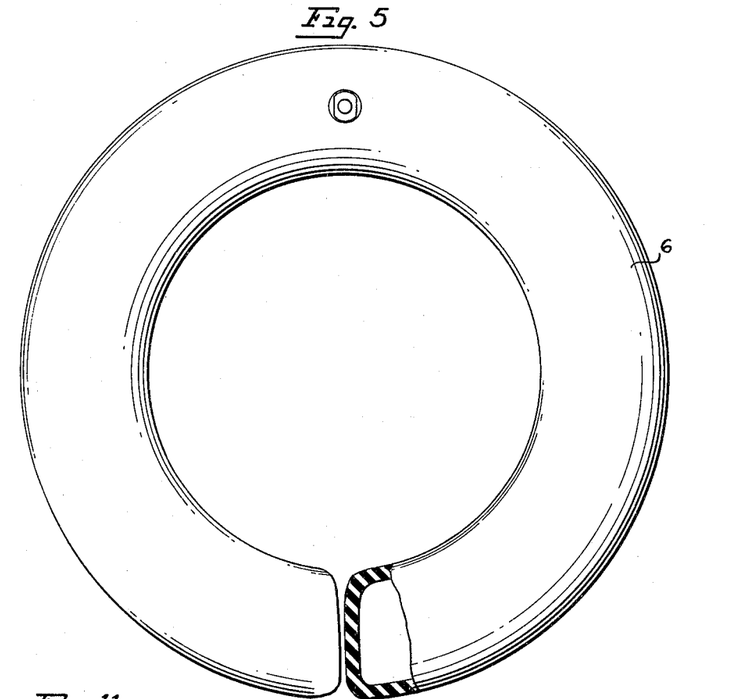
FIG. 5 is an elevational view of an axial tube removed from the clutch, with parts thereof broken away and shown in section.

The tubes 206 and 208 may be completely annular, as shown in FIG. 8, that is, joined to form a complete circle, and are so designed as to be axially expansible upon application of fluid pressure thereto, however, these members may be constructed as shown in FIG. 5, whereby the tubular members are substantially annular, except the ends are closed and abutted so as to provide a slit, which enables these tubes to be removed transversely from around the shaft, without the entire clutch unit having to be removed from the shaft. The tubes each have threaded connections 232 and 234 to threadably receive air connections, such as an L-connection 236 or a quick exhaust valve, in event such an exhaust valve is used. Air conduits such as 238, 240 and 242 are provided, which conduits and connections utilize O-ring seals, as will best be seen in FIG. 8, to connect some of the connections to aid in the quick removal and reattachment of the respective elements. Air connecting hose, such as shown at 84 and 92, in FIG. 1, are used to connect to the axially expansible tubes, substantially in the same manner as shown in FIG. 1.

The clutch plates 184 and 186 have spaced, cored passages 244 and 246, respectively, which passages permit entrance of air through the inner lateral portion of the openings which air will exhaust through the radial openings and out through the peripheral openings of the respective housings 164 and 166. It is to be pointed out that the inside diameter of the end plates 218 and 220 provide sufficient area of opening to permit a volume of air to pass therethrough and out through the respective openings 200, 244 and 246 and an opening formed between the radial grooves in the respective back-up plates. In this manner, air will flow freely through the clutch, thereby dissipating heat generated between the clutch plates 184 and 186 in engagement with the respective friction disc elements. Furthermore, with the clutch tubes 206 and 208 positioned in the exterior portion of the respective clutch housings 164 and 166, and with further heat barriers of heat resistant material such as asbestos composition or the like, being interposed therebetween, the axially expansible tubes 206 and 208 will be maintained comparatively cool, even though excessive clutching engagement is performed.

It is to be pointed out that the end plates 218 and 220 are shouldered and piloted within the respective outer ends of the clutch housings 164 and 166, with heat resistant gasket material 248 and 250 being interposed therebetween to minimize the heat transfer from the respective housings 164 and 166 to the end plates 218 and 220, in which the axially expansible tube elements 206 and 208, respectively, are positioned.

The assembly and disassembly of this form of the invention is very much the same as in the aforementioned form, that is, by removing the respective end plates 218 and 220, the tubes 206 and 208 may be moved axially outward, and if desired may be removed from around the shaft by lateral movement if the form of tube shown in FIG. 5 is used. Furthermore, the friction disc elements which, if semi-annular, may be moved outward from the respective housings 164 and 166 and removed laterally, including both the inner and the outer friction disc elements.

The operation of the present form of clutch is substantially the same as the form shown in FIGS. 1 and 2 and described above, and may be connected to any reverse gearing mechanism which utilizes a shaft within a shaft, as shown at 34 and 36, in FIGS. 1 and 2, and which shafts have hubs, such as hubs 30 and 32, respectively, thereon.

Having thus clearly shown and described the invention, what is claimed as new and desired to be secured by Letters Patent is:

In a reversing clutch, a pair of independent housings attachably secured together in back to back relation and adapted to be connected to a rotatable element on a prime mover, said housings each having an air inlet formed in an end thereof, pairs of ribbed friction discs elements within each of said housings and engaged in non-rotatable relation with respect thereto, at least one of said friction disc elements of each pair being movable axially with respect to the respective housings, two shafts rotatably mounted axially of said housings, a clutch disc element on each of said shafts and being rotatable therewith, each of said clutch disc elements being positioned intermediate said respective pairs of friction disc elements, each of said housings having a ribbed abutment intermeidate the innermost friction disc element of the pairs of friction disc elements, an end plate member on each outer end of each of said housings, an axially expansible air tube within each of said housings and being immediately adjacent the respective end plates, reaction members each having radial, spaced apart ribs, one of which reaction members is disposed intermediate each of said friction disc elements and the respective axially expansible tube adjacent thereto, conduit means connected to each said axially expansible tube to convey air under pressure thereto while said housings are rotating, bars radially disposed within the grooves formed by the ribs of each said reaction member and abridging each said reaction member, a screw threaded bolt attached to each end of each of said bars, which bars are spaced circumferentially of said reaction member, said bolts extending through adjacent end plates, a spring telescoped over each of said bolts, an end of each of said springs being in abutting relation with one of said end plates, a nut positioned on each of said bolts and being in binding engagement with the other end of each said springs, said springs exerting resilient pressure on each said axially expansible tube to exhaust air therefrom when air pressure is released from said tubes so as to release frictional engagement between said friction elements and said clutch disc element.

References Cited in the file of this patent

UNITED STATES PATENTS

| 1,577,004 | Turney | Mar. 16, 1926 |
| 2,107,954 | Morton | Feb. 8, 1938 |
| 2,348,025 | Peets | May 2, 1944 |
| 2,586,617 | Danly | Feb. 19, 1952 |
| 2,589,291 | Sanford | Mar. 18, 1952 |
| 2,606,637 | Davoust | Aug. 12, 1952 |
| 2,622,714 | Cardwell | Dec. 23, 1952 |
| 2,747,711 | Schmitter | May 29, 1956 |
| 2,759,583 | Ward | Aug. 21, 1956 |
| 2,774,453 | Wilson | Dec. 18, 1956 |
| 2,856,044 | Koenig | Oct. 14, 1958 |

FOREIGN PATENTS

| 938,501 | France | Apr. 5, 1948 |

OTHER REFERENCES

Wichita Bulletin No. 110, Wichita Falls Foundry & Machine Co. Received in U.S. Patent Office April 14, 1953 (pp. 2 and 3).